US006799028B2

(12) United States Patent
Bauer

(10) Patent No.: US 6,799,028 B2
(45) Date of Patent: Sep. 28, 2004

(54) MOBILE RADIO RECEIVER WITH INTEGRATED BROADCAST RECEIVER THAT FILLS BROADCAST GAPS DURING MOBILE BAND COMMUNICATION

(75) Inventor: Harald Bauer, Nürnberg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 545 days.

(21) Appl. No.: 09/741,661

(22) Filed: Dec. 19, 2000

(65) Prior Publication Data

US 2001/0024962 A1 Sep. 27, 2001

(30) Foreign Application Priority Data

Dec. 22, 1999 (DE) ........................................ 199 61 924

(51) Int. Cl.$^{7}$ ................................................ H04B 1/16

(52) U.S. Cl. ...................... 455/321; 455/323; 455/325; 455/333; 455/334

(58) Field of Search ............................. 455/324, 182.2, 455/192.2, 73, 333, 84, 260, 556.1, 323, 355, 334; 570/504, 528, 445, 493, 494, 433; 375/140, 130, 141, 143; 329/323, 346, 358

(56) References Cited

U.S. PATENT DOCUMENTS 4,056,737 A * 11/1977 Sequin ...................... 333/165
4,726,069 A * 2/1988 Stevenson .................... 455/46
5,023,930 A * 6/1991 Leslie ........................... 455/9
5,355,366 A * 10/1994 Li et al. ...................... 370/528
5,584,068 A * 12/1996 Mohindra ................... 455/324
5,953,640 A * 9/1999 Meador et al. ............... 455/73
5,970,390 A * 10/1999 Koga et al. .................... 455/42
5,987,018 A * 11/1999 Freeburg et al. ......... 370/310.2
6,104,708 A * 8/2000 Bergamo .................... 370/320
6,243,866 B1 * 6/2001 Rudolph et al. ............ 725/123
6,353,604 B2 * 3/2002 Grimwood et al. ......... 370/335
6,356,545 B1 * 3/2002 Vargo et al. ................ 370/355
6,377,590 B1 * 4/2002 Hoppal et al. .............. 370/528
6,388,360 B1 * 5/2002 Nysen et al. ........... 310/313 R
6,452,960 B1 * 9/2002 Sato ........................... 375/140

FOREIGN PATENT DOCUMENTS

DE 4141382 A1 6/1993 ............ H04M/1/00

* cited by examiner

*Primary Examiner*—Pablo N. Tran
(74) *Attorney, Agent, or Firm*—Aaron Waxler

(57) ABSTRACT

In order to simplify the circuitry upon integration of a mobile radio receiver in a terminal for mobile communication, the invention proposes the use of a receiving section in which at least one component is also arranged to receive broadcast signals, steps being taken so as to ensure that the gap arising in the broadcast reception is masked at instants at which control information is received for the mobile communication.

5 Claims, 3 Drawing Sheets

MOBILE RADIO RECEIVER WITH INTEGRATED BROADCAST RECEIVER THAT FILLS BROADCAST GAPS DURING MOBILE BAND COMMUNICATION

BACKGROUND OF THE INVENTION

1. Field of the Invention

The invention relates to an apparatus for mobile communication, for example a mobile radio receiver with an integrated broadcast receiver.

2. Description of the Related Art

For example, DE 41 41 382 A1 describes a cordless added-feature telephone provided with several additional functions, such as a computer, a dictation apparatus, a remote control and a broadcast and/or television receiver. The elements provided for telephone functions, for example the digit pad, function keys and notably the power supply should be shared by the telephone and the integrated additional functions.

The common use of other parts of an apparatus for mobile communication, for example keys, displays and power supply, has thus far been unsuccessful in mobile communication apparatus because for full availability the apparatus for mobile communication must receive control information also when it is not in use.

SUMMARY OF THE INVENTION

It is an object of the invention to enable common use of circuit elements of terminals of mobile communication for the reception of broadcast signals.

This object is achieved in that at least one component of the receiving section is arranged to receive broadcast signals, steps being taken so as to mask the gaps occurring in the broadcast reception at times when control information is received for the mobile communication.

The advantage resides in the fact that components of the mobile radio telephone receiver can now also be used for broadcast reception, without the gap arising upon reception of control information being noticed by a listener. It is notably when a digital signal processor (usually present any away) is used to mask the gap in the broadcast signal that the additional space required for the function of the broadcast receiver is smaller than if the broadcast receiving section and the receiving section of the mobile radio telephone receiver were integrated adjacent one another.

BRIEF DESCRIPTION OF THE DRAWINGS

The invention will be described in detail hereinafter with reference to the embodiments shown in the drawings.

Therein.

DETAILED DESCRIPTION OF THE INVENTION

Figure 1:
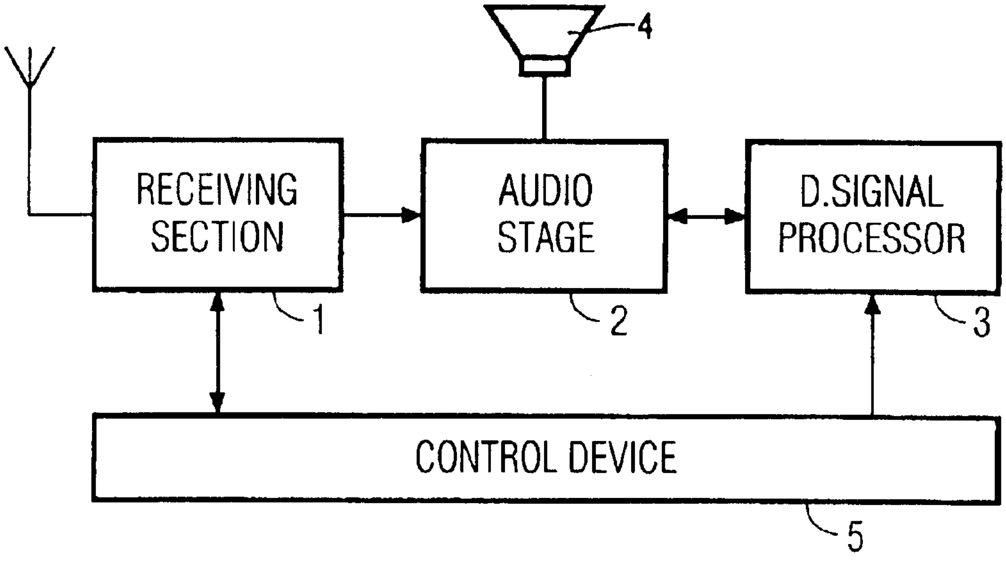
FIG. 1 shows a circuit diagram of a receiver according to the invention.

FIG. 1 shows the basic concept of a receiver according to the invention. As many components as possible of a receiving section 1 are used in common for the reception of the mobile radio channels as well as a radio station; further processing takes place by an audio stage 2 and a digital signal processor 3 for reproduction via a loudspeaker 4 or a headset. During the broadcast reception a control device 5 switches over the receiving section to the reception to the reception of the control channels in the mobile radio bands at the prescribed instants. During this time the digital signal processor 3 generates a substitute signal which masks the receiving gap in the broadcast band which is caused by the reception of the control information. For example, to this end the digital signal processor simply repeats a sequence received in the broadcast band prior to the switching-over, for example, the last 20 ms of an audio signal received.

Figure 2:
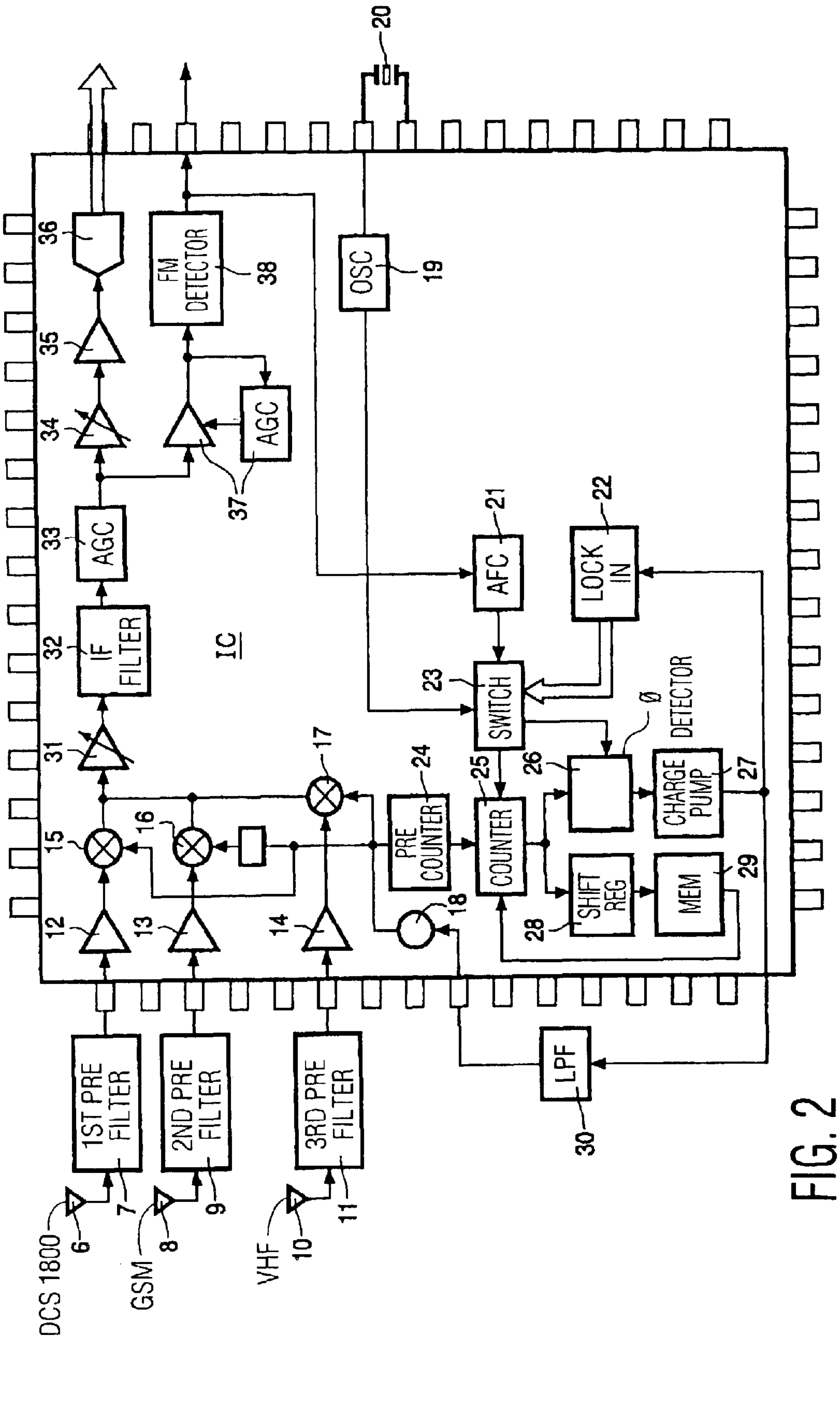
FIG. 2 shows a first embodiment in which only given circuit elements of a receiving stage are used in common for mobile radio reception and broadcast reception.
Figure 3:
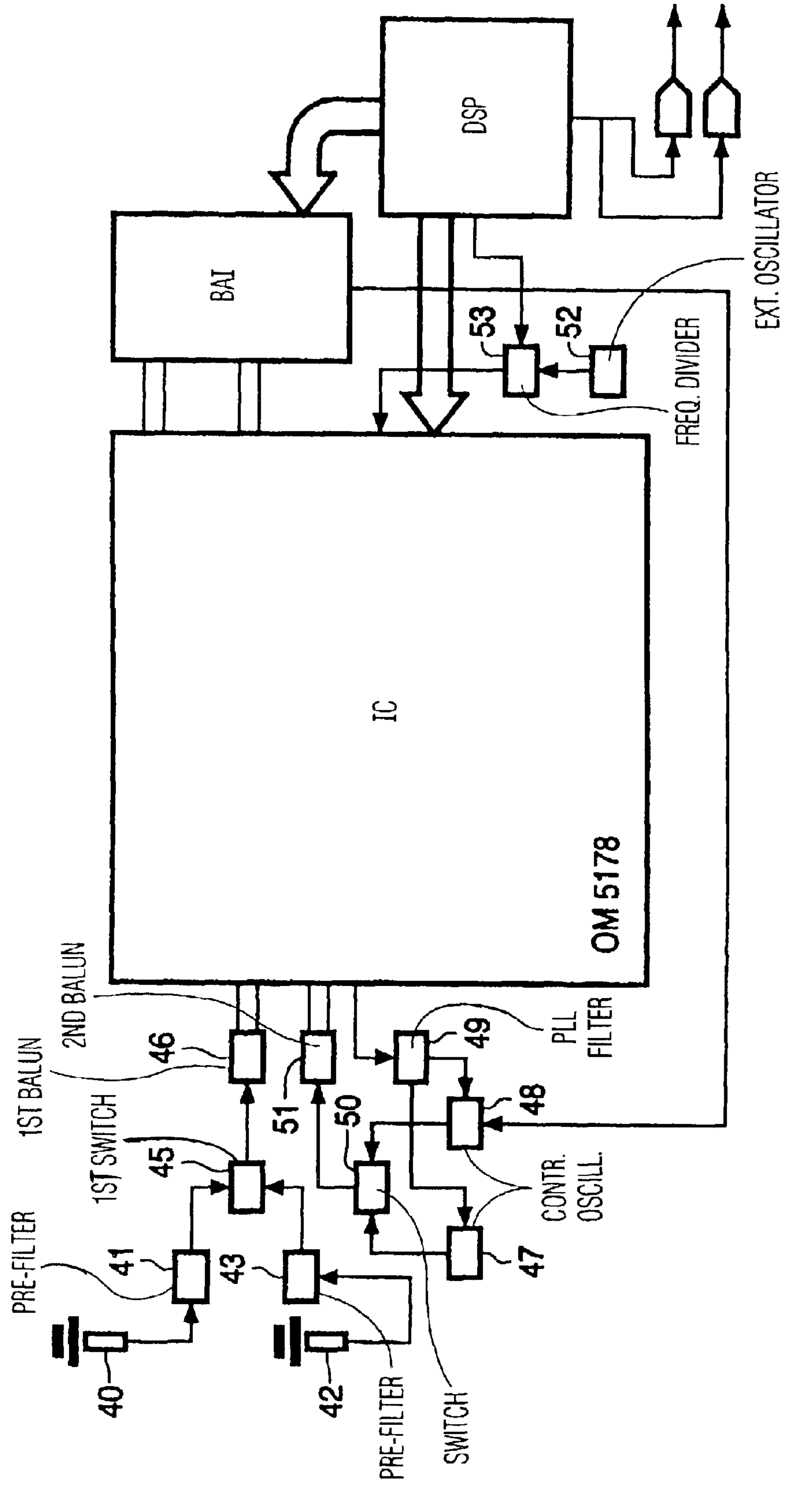
FIG. 3 shows a second embodiment in which an integrated receiving stage is fully used for the reception of mobile radio signals and broadcast signals.

FIG. 2 shows a feasible embodiment of a receiving section 1 of a multi-band radio apparatus for GSM, DCS 1800 and broadcast signals in the VHF band. Most components of the receiving section are contained in an integrated circuit IC. Because the transmission section is not used by the broadcast receiver, and hence does not form part of the invention, it has been omitted for the sake of clarity. Other components which are well known to a person skilled in the art, for example the keyboard, display elements and the power supply which are used in known manner for the mobile radio reception as well as for the broadcast reception have also been omitted for this reason.

A first antenna 6 and a first pre-filter 7 are arranged to receive the DCS 1800 band while a second antenna 8 and a second pre-filter 9 are arranged to receive the GSM band and a third antenna 10 and a third pre-filter 11 are arranged for VHF broadcast reception. The individual receiving signals are applied to separate mixing stages 15, 16, 17 via separate pre-amplifiers 12, 13, 14. The mixing frequency, however, is generated in a single oscillator 18, which utilizes a PLL circuit and is common to all mixing stages and hence to all frequency bands. The PLL circuit in the present embodiment consists of a quartz oscillator 19, a quartz crystal which is externally connected to the integrated circuit IC, an automatic frequency control unit 21, a lock-in detector 22, a sequential switching element 23, a pre-counter 24, a programmable counter 25, a phase detector 26, a charge pump 27, a shift register 28, a station memory 29 and a low-pass filter 30 which is externally connected to the IC.

The receiving concept chosen for the present embodiment is a near-zero intermediate frequency concept which utilizes a low intermediate frequency, for example, 100 kHz, in comparison with the receiving frequencies. The frequency band received each time is applied to a first automatic gain control 31 and subsequently traverses a poly-phase near-zero intermediate frequency filter 32. Subsequently, the receiving signals of GSM and DCS 1800 are further processed in a second automatic gain controller 33, a buffer amplifier 34 and an analog-to-digital converter 35 whereas a parallel processing branch with a third automatic gain controller 37 and a poly-phase FM detector 38 is provided for the broadcast signals.

Generally speaking, for the concept according to the invention a compromise must be found between the common use of individual circuit elements of the receiving section for the reception of mobile radio bands and broadcast bands on the one hand and the expenditure so as to enable the common use of such circuit elements on the other hand. In the foregoing embodiment the expenditure is increased merely in the common PLL circuit, for example, because the frequency in the case of broadcast transmitters is not as stable as that in mobile radio transmitters and hence the receiving frequency must be readjusted for the fluctuating transmission frequency of the broadcast transmitters.

In the second embodiment, however, an integrated circuit (the Philips circuit OM5178 in the present embodiment) is fully used, without modifications, also for the reception of the broadcast signal bands. It is merely because of the different receiving frequencies of mobile radio bands and broadcast bands that the PLL requires a lower reference clock. According to this concept of the invention GSM receiving signals and broadcast receiving signals are received via separate antennas 40, 42 and separate pre-filters 41, 43 so as to be applied, via a first switch 45 and a first balun 46, to the high-frequency signal input of the integrated circuit IC. Furthermore, for the GSM band and the broadcast band there are provided separate, external, controllable oscillators 47, 48 which receive, via an external PLL filter 49, the respective control signal of the PLL switching circuit included in the integrated circuit IC. The output signal of the relevant controllable oscillator is selected by means of a second switch 50 so as to be applied to the integrated circuit via a second balun 51. Moreover, use is made of an external oscillator 52 whose output signal is applied, because of the necessary lower reference frequency for the broadcast band, via a frequency divider 53 which is adjustable by the digital signal processor DSP. All specific functions for the broadcast reception such as, for example stereo detection as well as the detection of other functions contained in the broadcast signal, such as RDS (Radio Data Signal), are then executed completely in the digital signal processor DSP or in the Baseband Audio Interface BAI. For example, the AFC signal for readjusting the receiving frequency for broadcasts to the fluctuations of the broadcast transmitter are generated in the baseband audio interface BAI and applied to a second control input of the controllable oscillator 48 which is used for adjusting the broadcast receiving frequency.

The frequency bands GSM and DCS 1800, of course, are given merely by way of example. The invention can be used equally well for other receiving bands in as far as control information must be received from time to time in a standby state.

What is claimed is:

1. A terminal for mobile communication which includes a receiving section adapted for receiving one or more mobile communication signal types in which at least one component is also arranged to receive broadcast signals, said terminal including a switch for switching control information among the plurality of signal types, and a digital signal processor masking means for masking a gap that arises in the broadcast reception at instants at which control information is received for mobile communication by generating a substitute signal for masking the gap.

2. A terminal apparatus as claimed in claim 1, characterized in that the receiver is designed for a near-zero intermediate frequency concept.

3. A terminal as claimed in claim 1, wherein mobile radio receiving signals and broadcast receiving signals are conducted via a single intermediate filter (32).

4. A receiving apparatus as claimed in claim 1, characterized in that the mobile radio receiving signals and broadcast receiving signals can be applied to an input of a receiving stage via controllable switches (41).

5. A receiving apparatus as claimed in claim 1, characterized in that the substitute signal generation includes repeating a previously received and stored audio signal so as to mask the gap arising during the broadcast reception, and wherein said at least one component of the receiving section being adapted for receiving mobile communication signals is also adapted for receiving broadcast signals.

* * * * *